United States Patent Office
3,139,443
Patented June 30, 1964

3,139,443
METHOD OF MAKING ACETALS AND COMPOSITIONS RESULTING THEREFROM
George Sosnovsky, Chicago, Ill., assignor to IIT Research Institute, a corporation of Illinois
No Drawing. Filed Feb. 13, 1961, Ser. No. 88,645
11 Claims. (Cl. 260—345.9)

The present invention relates generally to the reaction of selected ethers with peresters and to a number of novel organic compounds resulting from such process.

In one of its more important aspects, my invention is directed to a novel process of making organic compounds of the class known as acetals and to a number of novel acetallic compositions. Such acetals are characterized by the general formula $$R-CH\begin{matrix}O-R\\O-R\end{matrix}$$

wherein R represents functional groups such as alkyl, phenyl and the like. Generically, R may be any hydrocarbon radical. When the herein described reaction is carried to completion, acetals are formed; by stopping the reaction at various intermediate stages thereof, I have likewise been able to produce a number of compositions including those of the general class comprising acyloxy compounds, alcohols, unsaturated ethers and organic acids, all of which may be recovered during the process.

Generally speaking, my process involves the reaction of a perester with a selected ether preferably in the presence of a copper salt catalyst to yield an acetal. The most pertinent prior art of which I am aware is found, or will be found in the chemical literature, and to better assist the reader in understanding such prior art, such will be briefly noted in the present specification.

The reactions of t-butyl peresters with olefins in the presence of copper or cobalt salt catalysts to form allylic esters have been described. See Kharasch and Sosnovsky, 80 J. Am. Chem. Soc. 756 (1958) and Kharasch, Sosnovsky and Yang, 81 ibid. 5819 (1959). Mentioned as catalysts for such reactions are cuprous halides and cupric or cobaltous 2-ethyl hexoates. Representative of such reactions is the following:

$$H_2C=CH-\underset{H}{\underset{|}{C}}-R' + R-C\begin{matrix}O\\\diagdown\\O-O-C(CH_3)_3\end{matrix} \xrightarrow{Cu^+}$$

$$H_2C=CH-\underset{|}{C}-R' + C(CH_3)_3OH$$
$$\underset{|}{O-C-R}$$
$$\underset{}{\overset{\|}{O}}$$

Under similar conditions t-butyl perbenzoate reacts with a number of other compositions as follows:

(a) With dioxane to yield dioxanyl benzoate $$\begin{matrix}H_2C\\|\\H_2C\end{matrix}\begin{matrix}O\\\diagup\quad\diagdown\\\diagdown\quad\diagup\\O\end{matrix}\begin{matrix}CH_2\\|\\CH_2\end{matrix} + \phi-\underset{\|}{\overset{O}{C}}-O-O-C(CH_3)_3 \longrightarrow$$

$$\begin{matrix}H_2C\\|\\H_2C\end{matrix}\begin{matrix}O\\\diagup\quad\diagdown\\\diagdown\quad\diagup\\O\end{matrix}\begin{matrix}CH_2\\|\\CH-O-\underset{\|}{\overset{O}{C}}-\phi\end{matrix} + C(CH_3)_3OH$$

(b) With phenyl allyl ether to yield 2-benzoyloxy-3-phenoxy-1-propene $$\phi-O-CH_2-CH=CH_2 + \text{t-butyl perbenzoate} \longrightarrow$$

$$\phi-O-\underset{|}{CH}-CH=CH_2 + C(CH_3)_3OH$$
$$\underset{}{O-\underset{\|}{\overset{}{C}}-\phi}$$
$$\underset{}{\overset{}{O}}$$

(c) With benzaldehyde to form benzoic acid anhydride $$\phi-CHO + \text{t-butyl perbenzoate} \longrightarrow$$

$$\phi-\underset{\|}{\overset{O}{C}}-O-\underset{\|}{\overset{O}{C}}-\phi + C(CH_3)_3OH$$

(d) With benzyl acetate to yield benzylidene acetate benzoate $$\phi-\underset{\|}{\overset{O}{C}}-O-O-C(CH_3)_3 + \phi-CH_2-O-\underset{\|}{\overset{O}{C}}-CH_3 \longrightarrow$$

$$\phi CH\begin{matrix}O-\underset{\|}{\overset{O}{C}}-CH_3\\O-\underset{\|}{\overset{O}{C}}-\phi\end{matrix} + C(CH_3)_3OH$$

See also: paper by Sosnovsky and Yang, J. Org. Chem., in print.

It is noted that in all of the foregoing reactions the activated hydrogen atom is replaced by an acyloxy group and the t-butoxy radical is converted to t-butyl alcohol.

In distinction to such known reactions, I have now surprisingly discovered that peresters, e.g., t-butyl perbenzoate, readily react in the presence of copper ions with either acyclic or cyclic ethers to form acetals with only quite low sideproduct yields of the acyloxy compounds; a result that one would not expect from the teachings of the prior art processes. For example, t-butyl perbenzoate readily reacts with the cyclic ethers tetrahydrofuran and tetrahydropyran to form primarily t-butyl tetrahydrofuranyl and t-butyl tetrahydropyranyl ethers respectively. The reaction of t-butyl peracetate with tetrahydrofuran in the presence of cuprous bromide at 56° C. gives a 41% yield of 2-t-butoxy tetrahydrofuran; t-butyl perbenzoate gives a 45% yield. The reaction of t-butyl perbenzoate with tetrahydropyran at 86° C. gives a 33% yield of 2-t-butoxy-tetrahydropyran.

Such reactions are found to proceed at a considerably slower rate in the absence of the copper salt catalyst; the quantitative comparisons are set out in detail in the examples hereinafter presented.

Accordingly, there are a number of objects of my invention, the chief ones being to provide a novel method of forming acetals and a number of intermediate compounds, and to provide a number of novel compositions of matter resulting from such process.

Another object of my invention is to provide a number of novel reaction products from the process of reacting selected ethers with tertiary butyl peresters.

A more specific object of my invention is to provide a novel class of organic compositions of the group tertiary alkoxy and acyloxy derivatives of ethers having a functional configuration —$CH_2$—$CH_2$—O—.

Other objects, features and advantages of my invention will become apparent to those skilled in this particular art from the following detailed disclosure thereof.

One of the important aspects of my invention is hinged about my discovery that peresters can be made to readily react with ethers containing an ether function and two activated adjacent methylene groups and it is to such discovery that the present application for Letters Patent is primarily directed. Exemplary of such ethers are tetrahydrofuran, tetrahydropyran and n-butyl ether. By such process I can conveniently make the compositions 2-t-butoxy-tetrahydrofuran

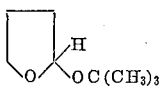

and 2-t-butoxy tetrahydropyran

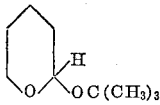

Before considering the specific operational details of several embodiments of my process, some of the more general features thereof should first be noted. Such process may best be envisioned as comprising three major sequential reactions, each one of which provides certain desirable end products. While such breakdown and analysis is presented, it should be understood, however, that in the actual performance of the process one may go directly through to acetal formation. Thus:

(I) Ether + Perester $\xrightarrow{Cu^+}$ Acyloxy + Alcohol (II) Acyloxy $\xrightarrow{heat}$ Unsaturated Ether + Acid (III) Unsaturated Ether + Alcohol $\xrightarrow{weak\ acid}$ Acetal In structural terms, such reactions may be considered as follows:

(I)
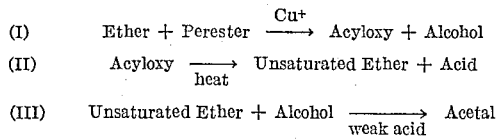

In such reaction it is seen that the perester splits at the bond between its two oxygen atoms to provide the radicals

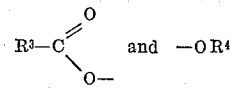

At the same time one hydrogen atom of the methylene group in the alpha position relevant to the oxygen of the ether is likewise split off to form the alcohol R⁴OH; to such alpha carbon then adds the acyloxy radical

to yield the intermediate acyloxy compound. It is noted in the foregoing reaction that the R groups may be substantially any hydrocarbon radical.

(II)
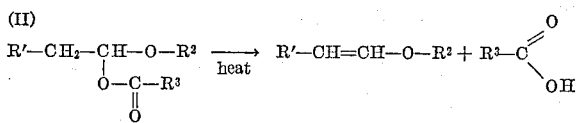

The acyloxy compound, when mildly heated then splits off one of its beta carbon hydrogens and the acyloxy radical which combine to form an acid, leaving thereby an unsaturated ethylenic ether.

(III)
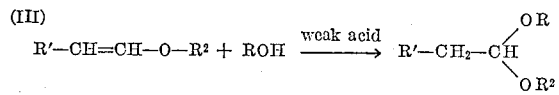

The alcohol that is employed in Step III may either be the same as, or different from, the alcohol produced in Step I. If the reaction is carried out completely to the acetal stage in one continuous process, such alcohol will be in most instances the same, although the possibility exists of adding a different alcohol. Step III is carried through in the presence of weak, organic acids such as those resulting from Step II; strong mineral acids are unnecessary.

The foregoing general description of my process may be best further considered by reference to the following examples thereof:

EXAMPLE 1

*Reaction of tertiary-butyl perbenzoate with tetrahydrofuran to produce 2-t-butoxy tetrahydrofuran.*—A mixture of t-butyl perbenzoate (0.5 mole), tetrahydrofuran (265 g., 3.7 mole) and cuprous bromide (0.1 g., 0.35 millimole) was heated under reflux for 14 hours. Structurally speaking, the overall reaction proceeds as follows:

(I)
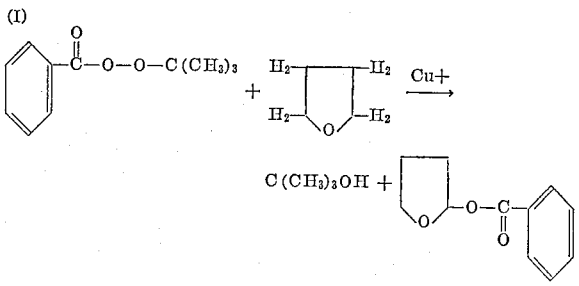

It is seen that the perester splits between its two adjacent oxygen atoms while at the same time one hydrogen splits off from the tetrahydrofuran. Such hydrogen adds to the t-butoxy radical to form t-butyl alcohol whereas the other perester product adds to the tetrahydrofuran to form 2-benzyloxy-tetrahydrofuran.

Step II involves pyrolysis:

(II)
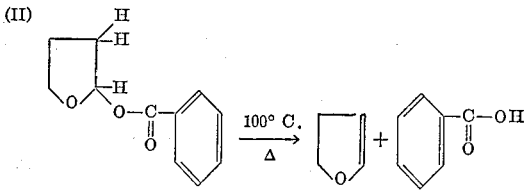

The 2-benzoyloxy-tetrahydrofuran, under such conditions, splits off one hydrogen and the benzoyloxy radical which combine to form benzoic acid leaving thereby 2,3-dihydrofuran.

In Step III, the 2,3-dihydrofuran is reacted with, in this instance, the t-butyl alcohol resulting from Step I, in the presence of a weak acid to form an acetal. Thus:

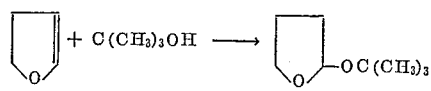

Such acetal is identified as 2-t-butoxy-tetrahydrofuran.

In carrying out the foregoing reaction, after the 14 hour reflux period and cooling, the reaction mixture was diluted with 50 ml. ether and extracted with 2 N sodium carbonate solution to remove 41 grams of benzoic acid. I obtained 32 grams of 2-t-butoxytetrahydrofuran, this representing a 45% yield. The product was characterized as follows:

Boiling point—40° C. at 11 mm. Hg; $n_D^{25}$ 1.4186.

| Analytical calculation for $C_8H_{16}O_2$ | | Found |
|---|---|---|
| C | 66.80 | 66.78 |
| H | 11.02 | 11.23 |
| Mol. Wt. | 144 | 146 |

*Infrared bands.*—Such bands were present at 1390 and 1365 cm.$^{-1}$ (t-butyl group) and 695, 755 (phenyl group). There were no such bands in the range 1730–1740 indicating the absence of carbonyl and there was no absorption in the hydroxy region.

In addition I also obtained 25 grams of 2-benzoyloxy tetrahydrofuran, representing a 25% yield. This had a boiling point of 96–100° C./0.2 mm. (with some decomposition). It had an infrared band at 1740 cm.$^{-1}$ (carbonyl).

EXAMPLE 2

*Reaction of t-butyl peracetate and tetrahydrofuran to produce 2-t-butoxytetrahydrofuran.*—A mixture of the following was heated under reflux for 14 hours:

Tetrahydrofuran _____ 133 g. (1.85 mole).
t-Butyl peracetate _____ 150 ml. of a 75% benzene solution (0.8 mole).
CuBr _____ 0.1 g. (0.35 millimole).

After such refluxing, the reaction mixture was diluted with 50 ml. ether and extracted with a dilute aqueous sodium carbonate solution to remove acetic acid therefrom. The ethereal solution was next washed with water, dried with sodium sulfate and concentrated over a steam bath. Following this, the remaining liquid was distilled at reduced pressure to yield the following:

2-acetoxytetrahydrofuran, 4 grams. B.P. 30–40°/0.1 mm.
2-t-butoxytetrahydrofuran, 46 grams (45% yield), B.P. 40–42°/13 mm., $n_D^{25}$ 1.4186

| Analytical calculation for $C_8H_{16}O_2$ | | Found |
|---|---|---|
| C | 66.80 | 66.78 |
| H | 11.02 | 11.23 |
| Mol. Wt. | 144 | 146 |

EXAMPLE 3

*Reaction of tetrahydrofuran with t-butyl perbenzoate in the absence of cuprous bromide.*—The following mixture was refluxed for 48 hours:

Tetrahydrofuran _____ 89 g. (1.22 mole).
t-Butyl perbenzoate _____ 39 g. (0.2 mole).

The reaction mixture was then permitted to cool to room temperature after which it was diluted with 50 ml. ether and then extracted with dilute sodium carbonate solution to remove benzoic acid (16 g., 67%). The remaining ethereal solution was washed with water, dried with sodium sulfate and concentrated on a steam bath. The remaining oil was distilled at reduced pressure to yield the following component:

(1) 2-t-butoxytetrahydrofuran, 69 g., 21%, B.P. 36–40°/10 mm.; $n_D^{25}$ 1.4190; infrared spectrum identical with that of an authentic sample.
(2) Unreacted t-butyl perbenzoate, 6.5 g., 6.8%, B.P. 68–70°/0.05–0.1 mm., $n_D^{25}$ 1.5008.
(3) Residue, 4 g.: a mixture of t-butyl perbenzoate and 2-benzoyloxy tetrahydrofuran.

EXAMPLE 4

*Reaction of t-butyl perbenzoate and tetrahydropyran.*—
t-Butyl perbenzoate (78 g., 0.4 mole) was added over a period of two hours to a mixture of tetrahydropyran (86 g., 1 mole) and cuprous bromide (0.1 g., 0.35 millimole) maintained at 84° C. After the complete addition of the t-butyl perbenzoate, the reaction mixture was heated under reflux for 10 hours. Following this, such reaction mixture was cooled to room temperature, diluted with ether (50 ml.) and extracted with 2 N sodium carbonate solution to remove benzoic acid (34.5 g., 72%). After such removal, the ethereal solution was washed with water, dried with sodium sulfate and concentrated at 10 mm. Hg. The oil then remaining was distilled at reduced pressure to yield the following:

(1) 2-benzoyloxytetrahydropyran, 20 g., 24%.
(2) 2-t-butoxytetrahydropyran, 21 g., 33%, B.P. 56°/13 mm., $n_D^{25}$=1.4268. Analytical calculation for $C_9H_{18}O_2$: C, 68.30; H, 11.48; mol. wt., 154. Infrared bands: 1390, 1365 cm.$^{-1}$ (t-butyl group). No bands were found at 695 and 755 (monosubstituted benzene), 1720–1740 (carbonyl) or in the hydroxy region.

EXAMPLE 5

*Reaction of dihydropyran and t-butyl alcohol in the presence of benzoic acid.*—The following reaction mixture was refluxed for 24 hours:

Dihydropyran _____ 24 g. (0.285 mole).
t-Butyl alcohol _____ 27 g. (0.365 mole).
Benzoic acid _____ 20 g. (0.165 mole).

Following such refluxing, the reaction mixture was cooled to room temperature, diluted with 50 ml. ether and extracted with 2 N sodium carbonate solution to remove 14 grams benzoic acid. The remaining ethereal solution was then washed with water, dried with sodium sulfate and concentrated over a steam bath. The remaining oil was distilled at reduced pressure to yield the following:

(1) 2-t-butoxytetrahydropyran, 17.5 g., 39%; B.P. 52°/11 mm.; $n_D^{25}$=1.4268.
(2) Residue, 7.0 grams.

EXAMPLE 6

*Reaction of dihydropyran and t-butyl alcohol in the presence of acetic acid.*—The following reaction mixture was refluxed for 12 hours:

Dihydropyran _____ 24 g. (0.285 mole).
t-Butyl alcohol _____ 27 g. (0.365 mole).
Glacial acetic acid _____ 20 g. (0.3 mole).

After the separation and treatment as shown in Example 5, I obtained 20 grams of 2-t-butoxytetrahydropyran, a yield of 44.5%. Its boiling point was 56° at 11 mm. Hg, $n_D^{25}$=1.4270 and its infrared spectrum was identical with that of an authentic sample.

It is noted that no reaction occurs between dihydropyran and t-butyl alcohol in the absence of acid from the system.

EXAMPLE 7

*Reaction of dihydropyran and t-butyl alcohol in the presence of cuprous bromide.*—The following mixture was refluxed for 12 hours:

Dihydropyran _____ 24 g. (0.285 mole).
t-Butyl alcohol _____ 27 g. (0.365 mole).
Cuprous bromide _____ 0.1 g. (0.35 millimole).

After the usual work up, I obtained 3.5 grams of 2-t-butoxytetrahydropyran, a yield of 7.8%, B.P. 53°/12 mm.; $n_D^{25}$=4272. The infrared spectrum was identical with that of an authentic sample.

EXAMPLE 8

*Reaction of t-butyl perbenzoate and n-butyl ether.*—
t-Butyl perbenzoate (19.4 g., 0.1 mole) was added over a period of four hours to a mixture of n-butyl ether (52 g., 0.4 mole) and cuprous bromide (0.1 g., 0.35 millimole) maintained at 95° C. After such addition was completed, the reaction at 95° C. was continued for 10 hours. Following this, the reaction mixture was cooled to room temperature, diluted with 50 ml. ethyl ether and extracted with 2 N sodium carbonate solution to remove benzoic acid (6.8 g., 56.5%). The remaining ethereal solution was then washed with water, dried with anhydrous sodium sulfate and concentrated at 10 mm. Hg. The oil then remaining was distilled at reduced pressure to yield the following:

(1) n-Butyl-ether, 28 g., B.P. 42°/17 mm.
(2) 1-n-butoxy-1-t-butoxy-butane, formula:

$$CH_3(CH_2)_2CH-O-(CH_2)_3CH_3$$
$$|$$
$$O-C(CH_3)_3$$

5.5 g., 27.5%; B.P. 88–90°/10 mm., $n_D^{25}=1.4148$
(3) 1-benzoyloxy-1-n-butoxybutane, 10 g., 40%; B.P. 80°/0.04 mm. (with some decomposition).

To the latter such compound was then added 40 ml. t-butyl alcohol and the resulting reaction mixture was refluxed for 48 hours. Following the usual work up and separation, I obtained the following:

(1) Benzoic acid, 4.8 g.
(2) 1-n-butoxy-1-t-butoxybutane, 3.1 g., 39%; B.P. 88–90°/10 mm., $n_D^{25}=1.4148$.

Analysis as $C_{12}H_{26}O_2$:

|   | Calculated | Found |
| --- | --- | --- |
| C | 71.2 | 71.15 |
| H | 12.96 | 12.65 |
| Mol. Wt. | 202 | 194 |

EXAMPLE 9

*Reaction of t-butyl perbenzoate and n-propyl ether.—* t-Butyl perbenzoate (39 g., 0.2 mole) was added over a two hour period to a mixture of n-propyl ether (37 g., 0.37 mole) and cuprous bromide (0.1 g., 0.35 millimole) maintained at 85–90° C. After four additional hours of reaction at this temperature, the reaction mixture was cooled to room temperature, diluted with 50 ml. ether, and extracted with 2 N sodium carbonate solution to remove benzoic acid (10.2 g.). As with previous examples, the ethereal solution was washed with water, dried with anhydrous sodium sulfate and concentrated at 10 mm. of mercury. The remaining oil was then distilled at reduced pressure to yield the following:

(1) 1-t-butoxy-1-n-propoxy propane having the formula $$CH_3CH_2CH-O-(CH_2)_2CH_3$$
$$|$$
$$O-C(CH_3)_3$$

6 grams, 17%; B.P. 60–62°/20; $n_D^{25}=1.4032$.
(2) 1-benzoyloxy 1-n-propoxy propane, 17 g., 38.5%; B.P. 88–92°/0.04 mm. (with some decomposition).

To the latter such compound was added t-butyl alcohol (50 ml.) and this reaction mixture was refluxed for 17 hours. Following the usual separation and treatment I obtained the following:

(1) Benzoic acid, 6 g., 65%.
(2) 1-t-butoxy-1-n-propoxy propane, 4.5 g., 35%; B.P. 52°/10 mm., $n_D^{25}=1.4030$.
(3) Unreacted benzoyloxy compound, 2.6 g.

Analysis as $C_{10}H_{22}O_2$:

|   | Calculated | Found |
| --- | --- | --- |
| C | 68.91 | 68.44 |
| H | 12.72 | 12.77 |
| Mol. Wt. | 174 | 166 |

EXAMPLE 10

2-benzoyloxy-tetrahydrofuran (11.6 g., 0.06 mole) was heated at 130–135° C. for one hour. 2,3-dihydrofuran was collected in a trap which was cooled by a Dry Ice-isopropanol mixture. I recovered 2.8 grams of such compound, representing a yield of 66%. After repeated distillation such compound was characterized by B.P. 52–54/747 mm., $n_D^{25}$ 1.4200. (It is noted that Barr and Rose in J. Chem. Soc. 3766 (1954) give the values B.P. 54/764 mm., $n_D^{20}$ 1.4230.) 5.3 grams of benzoic acid were also recovered, a yield of 69%.

In view of the complex nature of the aforedescribed reactions and the organic molecules employed therein and resulting therefrom, it is deemed that some brief discussion regarding the nature of such compounds may be useful to those not thoroughly familiar with such materials. As previously indicated, in its most essential feature, my invention is directed to the reaction of an ether compound containing both the ether linkage and two adjacent activated methylene groups with a perester preferably in the presence of copper ion to yield acetals.

As to the ethers which may be employed herewith, any such ether of the general formula $R-CH_2-CH_2-O-R$, whether cyclic or acyclic, may be used. Such ethers must contain four or more carbon atoms. R can be any hydrocarbon. In addition to the ethers previously mentioned in the present specification, other representative such compounds, but not being limited thereto, are for example, methyl-n-butyl, ethyl-n-butyl, di-n-butyl, di-n-amyl ethers.

As to the peresters which are useful herewith, such are characterized by the general formula $$R_1-\overset{O}{\underset{\|}{C}}-O-O-R_2$$

where $R_1$ and $R_2$ may be either the same or different hydrocarbon functional groups. In some instances $R_1$ may be hydrogen. Such groups may include, but are not limited to, methyl, ethyl, phenyl, etc. As noted above, under the conditions of the present process, e.g., refluxing in the presence of an ether, such peresters must be capable of being split across the —O—O— bonding to yield the two radicals $$R-\overset{O}{\underset{\|}{C}}-O-\text{ and }-OR$$

The employment of copper ion in these ether-perester reactions provides an excellent catalytic effect. Most conveniently and expeditiously such ion is provided by cuprous halide salts, e.g., bromide, chloride, etc., but a number of other such sources may be used.

The acetals which result when my process is carried to completion are characterized by the general formula $$R_1-CH_2-CH{\overset{OR_2}{\underset{OR_3}{\diagup\!\!\diagdown}}}$$

where again the various R designated groups may be the same or different. $R_1$ and $R_2$ are contributed from the original ether; $R_3$ comes immediately from the alcohol with which the unsaturated ethylenic ether is reacted in the third phase of my process. As noted above, such alcohol is produced from the terminal —OR group of the original perester and the —R of this provides $R_3$ of the final acetal. Such $R_3$ may be different or mixed if a different alcohol than the one inherently produced is added to the reactant system. $R_1$ may be either hydrogen or a hydrocarbon; $R_2$ and $R_3$ are hydrocarbon radicals.

It will be understood that various modifications and variations may be effected without departing from the spirit or scope of the novel concepts of my invention.

I claim as my invention:

1. The method of making 2,3-dihydrofuran which comprises the steps of heating at approximately 100° C. 2-benzoxy-tetrahydrofuran to yield 2,3-dihydrofuran and separating said compound from the other reaction products.

2. The method of making 2-t-butoxy-tetrahydrofuran which comprises the steps of: making a mixture of t-butyl peracetate and tetrahydrofuran; heating said mixture in the presence of copper ion and separating the resulting 2-t-butoxy-tetrahydrofuran from the other reaction products.

3. The method of making 2-t-butoxy-tetrahydrofuran which comprises the steps of: making a mixture of t-butyl perbenzoate and tetrahydrofuran; heating said mixture in the presence of copper ion and separating the resulting 2-t-butoxy-tetrahydrofuran from the other reaction products.

4. The method of making 2-t-butoxy-tetrahydropyran which comprises the steps of: making a mixture of t-butyl peracetate and tetrahydropyran; heating said mixture in the presence of copper ion and separating the resulting 2-t-butoxy-tetrahydropyran from the other reaction products.

5. The method of making 2-t-butoxy-tetrahydropyran which comprises the steps of: making a mixture of t-butyl perbenzoate and tetrahydropyran; heating said mixture in the presence of copper ion and separating the resulting 2-t-butoxy-tetrahydropyran from the other reaction products.

6. The method of making 1-n-butoxy-1-t-butoxybutane which comprises the steps of making a mixture of t-butyl peracetate and n-butyl ether; heating said mixture in the presence of copper ion and separating the resulting 1-n-butoxy-1-t-butoxybutane from the other reaction products.

7. The method of making 1-n-butoxy-1-t-butoxybutane which comprises the steps of making a mixture of t-butyl perbenzoate and n-butyl ether; heating said mixture in the presence of copper ion and separating the resulting 1-n-butoxy-1-t-butoxybutane from the other reaction products.

8. The method of making an unsaturated ethylenic ether which comprises the steps of: making a mixture of an ether of the formula R—CH$_2$—CH$_2$—O—R with a perester of the formula

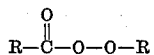

where R is selected from the group consisting of unbranched, unsubstituted alkyl and aryl radicals; heating said mixture to form an acyloxy compound of the formula

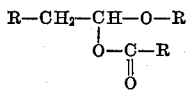

and an alcohol of the formula R—OH; separating said acyloxy compound from said alcohol; and heating said acyloxy compound to form an unsaturated ethylenic ether of the formula R—CH=CH—O—R and separating such ether from the other reaction products.

9. The method as defined in claim 8 wherein said ether-perester mixture is heated in the presence of copper ion.

10. The method of making an acetal which comprises the steps of:

(1) making a mixture of a first compound selected from the group consisting of tertiary butyl peracetate and tertiary butyl perbenzoate with an ether of the formula R—CH$_2$—CH$_2$—O—R;
(2) heating said mixture at a temperature less than 100° C. to form an acyloxy compound of the formula

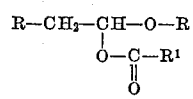

wherein R$^1$ is selected from the group consisting of methyl radical and phenyl radical depending on the t-butyl perester employed in the starting mixture, and an alcohol of the formula R—OH;
(3) heating said acyloxy compound at a temperature of about 100° C. to form an unsaturated ethylenic ether of the formula

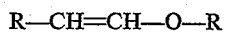

and an acid of the formula

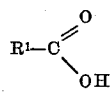

wherein R$^1$ is selected from the group consisting of methyl radical and phenyl radical depending on the t-butyl perester employed in the starting mixture;
(4) contacting such unsaturated ethylenic ether with an alcohol of the formula R—OH in the presence of an acid to form an acetal,
wherein in the above-defined process R is selected from the group consisting of unbranched, unsubstituted alkyl and aryl radicals, and
(5) separating the acetal thus formed from the other remaining reaction products.

11. The method as defined in claim 10 wherein said mixture of t-butyl peracetate or t-butyl perbenzoate and ether is heated in the presence of copper ion.

References Cited in the file of this patent
UNITED STATES PATENTS 2,451,949    Heinemann   Oct. 19, 1948
2,858,322    Kubler et al.   Oct. 28, 1958

OTHER REFERENCES

Beilstein's Handbuch, Fourth Edition, vol. 1, page 630 (1918).

Royal: Advanced Organic Chemistry, page 531, 2nd edition, Prentice-Hall, Inc., Englewood Cliffs, New Jersey (1956).